Sept. 22, 1959   J. L. MARTIN   2,905,724
PROCESS FOR VAPOR PHASE NITRATION OF ALKANES
Filed June 21, 1957
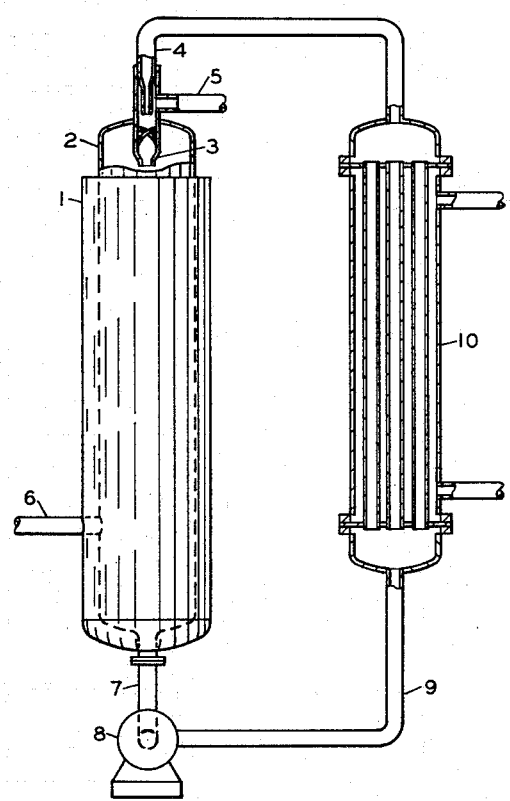
INVENTOR
Jerome L. Martin
BY Francis M. Crawford
ATTORNEY

United States Patent Office 2,905,724
Patented Sept. 22, 1959

2,905,724

PROCESS FOR VAPOR PHASE NITRATION OF ALKANES

Jerome L. Martin, Terre Haute, Ind., assignor to Commercial Solvents Corporation, Terre Haute, Ind., a corporation of Maryland Application June 21, 1957, Serial No. 667,241

2 Claims. (Cl. 260—644)

My invention relates to the vapor phase nitration of alkanes and more particularly to a method and apparatus for conducting the vapor phase nitration reaction under isothermal conditions.

In the past, a number of processes have been devised for carrying out the vapor phase nitration of alkanes. The nitration reaction is an exothermic reaction and consequently generates heat during the reaction period. Thus the temperature of the reaction has a tendency to increase during the time the reaction is being run, and, in a continuous process, to give a temperature gradient in the reactor. Prior processes have consequently aimed at controlling the heat of reaction so as to maintain as closely as possible an essentially uniform temperature within the reactor. In furtherance of this objective, prior processes involved the use of a heat absorbing jacket or bath such as a salt bath to absorb and convey away the excess heat of reaction or a system such as that described in U.S. Patent 2,418,241 wherein the alkane to be nitrated was contacted with incremental portions of nitric acid added to the reactor at different points.

As indicated above, the desirable condition is to maintain a uniform temperature in the reactor throughout the reaction period to enable the optimum temperature to be employed throughout the reaction period. In this manner the effect of competing reactions is minimized, the effect of hot spots on apparatus life is minimized, etc.

I have now discovered a new apparatus and process for carrying out the nitration reaction whereby I am able to maintain an essentially isothermal condition throughout the reactor during the entire reaction period. By employing my new process, I am able to obtain increased yields of nitroparaffins even when employing mole ratios of alkane to nitric acid which have heretofore been considered impractical and uneconomical for commercial use.

In carrying out my new process I prefer to spray nitric acid and alkane simultaneously into a reaction chamber with a molten salt maintained at the desired reaction temperature. While I can employ temperatures throughout a broad range of from 200° to 550° C. in carrying out my nitration reaction, I prefer to employ a temperature ranging from about 390° to 440° C. Consequently, the choice of salt to be employed as the molten medium for my new reaction depends upon the choice of temperature at which the reaction is to be carried out. I prefer to employ an eutectic mixture of potassium and sodium nitrates since such mixture can be maintained in the molten state throughout a temperature range of about 260° to 550° C. without solidification or decomposition. Other single salts or mixtures of salts can obviously be employed as, for example, an eutectic mixture of sodium, potassium and lithium nitrates which has a melting point below 200° C., i.e. about 175° C.

In carrying out my new reaction, I preferably introduce the alkane and nitric acid as a mixture to the reactor, the mixture being maintained at a temperature below that at which the alkane and nitric acid will react until the mixture is introduced to the reactor and thereby contacted with the molten salt. I can, of course, introduce the nitric acid and alkane to be nitrated in separate streams to the reactor.

I can employ alkane to be nitrated and nitric acid in a mole ratio ranging from about 1:1 up to about 40:1 although, one of the advantages of our new process lies in the fact that I can obtain commercially satisfactory yields at the lowest mole ratio of 1:1. As indicated above, the mixture of nitric acid and alkane is introduced to the reaction zone simultaneously with the molten salt maintained at the desired reaction temperature. The amount of molten salt which I introduce to the reaction chamber simultaneously with the mixture of alkane and nitric acid is large compared with the weight of nitric acid and alkane introduced. Thus, I introduce the alkane and nitric acid mixture simultaneously with an amount of molten salt of about 30 times the weight of alkane and nitric acid introduced, the molten salt being sprayed into the reaction chamber so that a massive amount of heat is released in the reaction chamber by the molten salt compared with the heat of reaction generated by the reaction of the nitric acid and alkane to be nitrated. Since the amount of heat liberated is small compared with the total heat capacity of the molten salt in the system, the amount of heat liberated does not make a measurable change in the overall amount of heat present, and thus I am able to maintain the isothermal condition which is desired for the reaction. In short, I employ an amount of molten salt with respect to the amount of alkane and nitric acid such that the amount of heat released by the molten salt is large enough to be unaffected by the heat generated by the reaction of nitric acid and alkane to be nitrated.

Since the reaction product of nitric acid and alkane is in the gaseous phase, it can easily be removed from the reaction zone by means of a vapor exit while the molten salt is collected, pumped through a heat exchanger to maintain the desired temperature after which it is recirculated to the reaction chamber.

A suitable apparatus for carrying out my new process is depicted in the accompanying drawing. The apparatus consists of a reactor shell 1 enclosing a reaction chamber 2 having a spray nozzle 3 to which is connected a molten salt inlet 4 and an alkane-nitric acid inlet 5. The reactor has a gaseous reaction product exit 6 and a molten salt exit 7 which leads to a pump 8. The pump 8 is connected by means of a line 9 to a heat exchanger 10 which can be a gas-fired heater or any other suitable heat transfer system. The heat exchanger is then connected to the reactor by means of the reactor molten salt inlet line 4.

In carrying out my new process in the apparatus depicted in the accompanying drawing, I prefer to circulate a molten salt mixture in the system, pumping the same by means of the pump 8 through the line 9 to the heat exchanger 10 where it is adjusted to the desired temperature after which it flows through the line 4 to the spray nozzle 3 from which the molten salt mixture is sprayed into the reaction chamber 2. The molten salt mixture collects in the base of the reaction chamber from which it passes through the line 7 to the pump 8 for recirculation in the manner described. A mixture of nitric acid and alkane to be nitrated is introduced through the line 5 to the spray nozzle 3 from which an intimate mixture of molten salt, alkane and nitric acid, is sprayed into the reaction chamber at the desired temperature preferably between 390 and 440° C. Employing propane and nitric acid in a molar ratio of 1:1 at a rate of 1,000 pounds of the mixture per hour, I circulate the molten salt at such a rate as to introduce the molten salt to the reaction chamber through the spray nozzle 3 at a rate of about 30,000 pounds/hr. The gaseous reaction products including nitroparaffins are continually removed from the reaction chamber through the line 6. By thus operating my process, I am able to obtain conversions as high as about 35% based on the nitric acid.

Utilizing the described reactor, I can also carry out the nitration reaction by introducing the alkane nitric acid mixture into the reaction chamber 2 by means of a spray nozzle 3 attached to line 6, flowing the gaseous reaction mixture countercurrent to the downward flow of molten salt from line 4, and recovering the gaseous reaction products as they are removed through line 5.

In carrying out my reaction, it is desirable to use an acid strength which causes the nitration system to be in heat balance, so that a relatively small heat exchanger can be used and only small amounts of thermal energy need be added to or removed from the system at any time to control the reactor temperature. I can employ aqueous nitric acid of any convenient concentration. Thus I can employ concentrations ranging from about 20 to about 95%; however, from an economic standpoint, I prefer to utilize a nitration process wherein the heat balance is adapted to the use of nitric acid of a concentration of about 55 to 65% since this concentration is conveniently obtained and has a water content which does not appreciably lower the yields. My process relates particularly to the nitration of the lower alkanes such as methane, ethane, propane, butane, pentane, hexane, etc.

Various equivalents of my new process and apparatus will obviously occur to those skilled in the art, and I intend to include such equivalents within the scope of my invention.

Now having described my invention, what I claim is:

1. In a process for the nitration of lower alkanes by the reaction of a lower alkane with nitric acid having a concentration ranging from 20 to 95% by weight, the improvement which consists in carrying out the reaction under isothermal conditions by introducing into a reaction zone a mixture of lower alkane and nitric acid simultaneously with a spray of molten salt selected from the group consisting of sodium nitrate, potassium nitrate and lithium nitrate and mixtures thereof, at a temperature ranging from about 200 to 550° C. and in an amount at least about 30 times greater than the weight of the mixture of alkane and nitric acid, and recovering the gaseous reaction products including nitroalkanes from the reaction zone.

2. In a process for the nitration of propane, the steps which consist of spraying a mixture of propane and nitric acid having a concentration ranging from 20 to 95% by weight in a mole ratio of about 1:1 simultaneously with molten salt selected from the group consisting of sodium nitrate, potassium nitrate and lithium nitrate and mixtures thereof, in an amount at least about 30 times greater than the weight of the mixture of propane and nitric acid into a reaction zone, the temperature of the molten salt ranging from about 390 to about 440° C., and removing gaseous reaction products, including nitroalkanes, from the reaction zone.

References Cited in the file of this patent

UNITED STATES PATENTS

| | | |
|---|---|---|
| 1,436,332 | Barbet | Nov. 21, 1922 |
| 1,990,113 | Burghart | Feb. 5, 1935 |
| 2,260,258 | Martin | Oct. 21, 1941 |
| 2,332,527 | Pyzel | Oct. 26, 1943 |
| 2,609,401 | Hass et al. | Sept. 2, 1952 |
| 2,654,788 | Marshall | Oct. 6, 1953 |